(12) United States Patent
Tada (10) Patent No.: US 7,212,373 B2
(45) Date of Patent: May 1, 2007

(54) SERVO WRITER AND METHOD FOR WRITING SERVO PATTERNS USING THE SAME

(75) Inventor: Nobuyuki Tada, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/220,692

(22) Filed: Sep. 8, 2005

(65) Prior Publication Data

US 2006/0066977 A1 Mar. 30, 2006

(30) Foreign Application Priority Data

Sep. 30, 2004 (JP) ............... 2004-288499

(51) Int. Cl.
*G11B 5/584* (2006.01)
*G01B 21/02* (2006.01)
*G11B 5/09* (2006.01)

(52) U.S. Cl. ............... 360/77.12; 360/48; 360/75
(58) Field of Classification Search ............... None
See application file for complete search history.

(56) References Cited

U.S. PATENT DOCUMENTS 6,542,325 B1 * 4/2003 Molstad et al. .......... 360/77.12

6,580,581 B1 * 6/2003 Bui et al. ............... 360/78.02
6,914,741 B2   7/2005 Izumida et al.
7,031,087 B2 * 4/2006 Hashimoto ............... 360/53

FOREIGN PATENT DOCUMENTS

JP       2000-48431 A       2/2000

* cited by examiner

*Primary Examiner*—Andrea Wellington
*Assistant Examiner*—Jason Olson
(74) *Attorney, Agent, or Firm*—Sughrue Mion, PLLC (57) ABSTRACT

A servo writer includes a tape running drive unit for running a magnetic tape in a longitudinal direction; a pulse signal generating circuit for generating pulse signals; a write head having a plurality of linear magnetic gaps thereon in a running direction of the magnetic tape at a predetermined interval, inputting pulse signals generated by the pulse signal generating circuit, and writing servo patterns corresponding to the magnetic gaps onto the magnetic tape with pitches between the servo patterns; a read head for sensing the servo patterns written on the magnetic tape and outputting pulse signals corresponding to the sensed servo patterns; a control unit for controlling the tape running drive unit to maintain constant the running speed of the magnetic tape based on a time interval between the pulse signals resulted from two of the appropriate linear patterns in parallel included in each of the servo patterns.

20 Claims, 6 Drawing Sheets

SERVO WRITER AND METHOD FOR WRITING SERVO PATTERNS USING THE SAME

BACKGROUND OF THE INVENTION

1. Field of the Invention

The present invention relates to a servo writer for writing servo patterns onto a magnetic tape, more particularly to a servo writer for writing the servo patterns thereonto at a predetermined pitch.

2. Description of the Related Art

One of methods of improving storage density per unit area of a magnetic tape for recording and saving data is to increase the number of data bands for writing data thereon (i.e. to increase the linear density in the width direction of the magnetic tape) In this case, simply relying on a mechanical accuracy of a running mechanism of the magnetic tape has difficulties in securing a complete tracing of a reproducing head over the data bands.

To solve the difficulties, a complete tracing is accomplished by providing the magnetic tape with servo bands thereon in parallel to the data bands so that a recording head and the reproducing head can be servo-controlled in accordance with the servo bands. Note that each servo band is made of a plurality of servo patterns which are written in the running direction at a predetermined pitch therebetween, and which are previously formed on the magnetic tape in a manufacturing process thereof.

In order to perform the above servo control properly, a plurality of servo patterns forming a servo band are needed to be written in such a manner that every pitch therebetween should fall within a predetermined value without variations.

For the sake of a high accurate writing of servo patterns onto a magnetic surface of the magnetic tape at a desired pitch, a special device called as a servo writer has been employed, writing the servo patterns onto the magnetic surface by use of a fixed write head at a constant driving frequency with the magnetic tape kept running at a precisely constant speed. This servo writer is equipped with a tape speed detector for measuring a magnetic tape running speed, and detected values on the running speed measured thereby is fed back to a capstan (tape running drive unit) so that a more precise running speed can be achieved.

In a conventional servo writer, a rotational roller in rotatable contact with a running magnetic tape has been used as a tape speed detector, and the magnetic tape running speed is derived from the rotational speed of the rotational roller, as disclosed in JP-A-2000-048431, for example.

However, there have been the following disadvantages in the conventional servo writer whose rotational roller is for use as a tape speed detector. If slippage occurs between the magnetic surface of the running magnetic tape and the outer circumferential surface of the rotational roller in rotatable contact with this magnetic surface, linear movement of the magnetic tape cannot be converted into a proper rotational movement generated by the rotational roller. This phenomenon can become more apparent if more viscous air is taken up as the magnetic tape runs at a higher speed, resulting in deterioration in accuracy of detected values of the running speed. Variations in diameter of the rotational roller due to abrasion by use or expansion/shrinkage resulting from changes in temperature can also become an error factor of the detected values of the running speed.

If a feed back control for the magnetic tape running speed is based on detected values including such an error, a problem may occur that the pitches between the servo patterns to be written onto the magnetic tape will have values with lower accuracy, departing from the desired value.

SUMMARY OF THE INVENTION

To solve the disadvantages mentioned above, it is an object of the present invention to provide a servo writer capable of a highly accurate measurement on a magnetic tape running speed, whereby capable of writing servo patterns onto the magnetic tape with an accurate pitch therebetween.

The servo writer according to the present invention comprises:

(a) a tape running drive unit for running a magnetic tape in a longitudinal direction;

(b) a pulse signal generating circuit for generating pulse signals;

(c) a write head disposed on a running path of the magnetic tape, having a plurality of linear magnetic gaps thereon in a running direction of the magnetic tape at a predetermined interval, inputting pulse signals generated by the pulse signal generating circuit, and writing servo patterns corresponding to the magnetic gaps onto the magnetic tape with pitches between the servo patterns, wherein at least two of the plurality of linear magnetic gaps are parallel to each other;

(d) a read head disposed on a down-stream side of the write head on the running path of the magnetic tape, sensing the servo patterns written on the magnetic tape and outputting pulse signals corresponding to the sensed servo patterns; and (e) a control unit for providing a control either for the tape running drive unit so as to maintain constant the running speed of the magnetic tape or for the pulse signal generating circuit so as to maintain constant the pitches between the servo patterns adjacent in the longitudinal direction of the magnetic tape, based on a time interval between pulse signals, among the pulse signals output from the read head, resulted from two of appropriate linear patterns in parallel included in each of the servo patterns.

With respect to the two of the appropriate linear patterns in parallel included in each of the servo patterns, they are disposed vertically to the longitudinal direction of the magnetic tape, and may also be disposed inclinedly to the longitudinal direction of the magnetic tape.

According to a first aspect of the present invention, the control unit of the servo writer provides a control for the tape running drive unit so as to maintain constant the running speed of the magnetic tape, based on the time interval between pulse signals, among pulse signals output from the read head, resulted from two of the appropriate linear in parallel patterns included in each of the servo patterns.

The control unit further comprises:

(a) an actual speed calculator for calculating an actual running speed of the magnetic tape based on the time interval between the pulse signals resulted from two of the appropriate linear patterns in parallel included in each of the servo patterns and on the interval between two of the magnetic gaps in parallel on the write head corresponding to the two of the appropriate linear patterns in parallel;

(b) a differential speed calculator for calculating a differential speed based on a predetermined target speed and on the calculated actual running speed of the magnetic tape; and (c) a set-speed updating unit for updating a set-speed of the tape running drive unit based on the above differential speed.

In the servo writer of the first aspect, the actual running speed of the magnetic tape is controlled so that the running speed thereof strictly agrees with the target speed. More specifically, the interval between two of the linear magnetic gaps in parallel on the write head is used as a reference interval. This reference interval can be provided on the write head with a high accuracy and never varies over time during running of the magnetic tape. Hence, based on this reference interval between the magnetic gaps, a highly accurate measurement can be achieved on the actual running speed of the magnetic tape, and a control based on this accurate measurement can provide and maintain a strict agreement of an actual running speed of the magnetic tape with a desired running speed. This high accuracy in constant running of the magnetic tape also ensures a highly accurate agreement of the pitches between the servo patterns written on the magnetic tape with a pitch value that has been input as an initial condition without variations when the write head writes servo patterns at a constant frequency onto the magnetic tape at a constant running.

According to a second aspect of the present invention, the control unit of the servo writer provides a control for the pulse signal generating circuit so as to maintain constant the pitches between the servo patterns adjacent in the longitudinal direction of the magnetic tape, based on the time interval between the pulse signals, among pulse signals output from the read head, resulted from two of the appropriate linear in parallel patterns included in each of the servo patterns.

The control unit further comprises:

(a) an actual speed calculator for calculating an actual running speed of the magnetic tape based on the time interval between the pulse signals resulted from two of the appropriate linear patterns in parallel included in each of the servo patterns and on the interval between two of the magnetic gaps in parallel on the write head corresponding to the two of the appropriate linear patterns in parallel; and (b) a driving frequency calculator for calculating driving frequencies of the pulse signals based on a predetermined target pitch for the pitch between the servo patterns and on the calculated actual running speed of the magnetic tape.

In the servo writer of the second aspect, as in the first aspect of the present invention, the interval between two of the linear magnetic gaps in parallel on the write head is used as a reference interval for maintaining the tape running speed at a constant speed, and a target speed based on this reference interval of the magnetic gaps and a pitch value are also set as initial input conditions.

Contrary to the first aspect of the present invention, wherein the write head writes the servo patterns at a constant frequency $f_0$, the write head according to the second aspect of the present invention varies its frequency in accordance with variable actual running speeds during writing the servo patterns onto the magnetic tape. Thereby, the pitches between the servo patterns in series written on the magnetic tape can be agreed with the pitch value input as an initial condition with a high accuracy without variations.

A third aspect and a forth aspect according to the present invention relate to methods of writing servo patterns using the servo writer according to the first aspect and the second aspect of the present invention, respectively.

As explained above, the present invention provides the servo writer capable of writing servo patterns at a predetermined pitch therebetween onto the magnetic tape, and methods for writing the servo patterns thereby as well.

DETAILED DESCRIPTION OF PREFERRED EMBODIMENT

Hereinafter, explanations will be given on embodiments according to the present invention, with reference to the drawings.

First Embodiment

Figure 1:
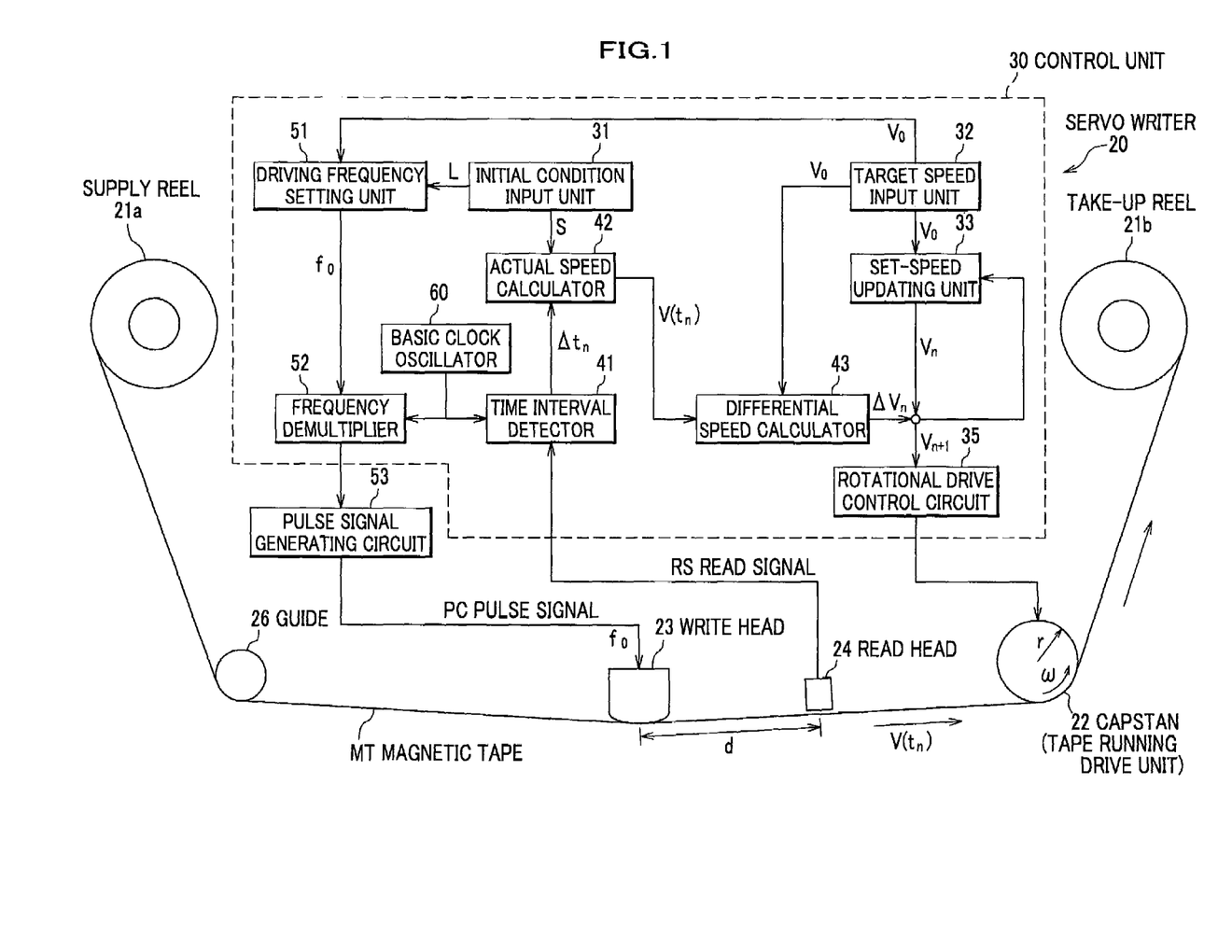
FIG. 1 is a line block diagram showing a basic constitution of a servo writer according to a first embodiment.
Figure 2:
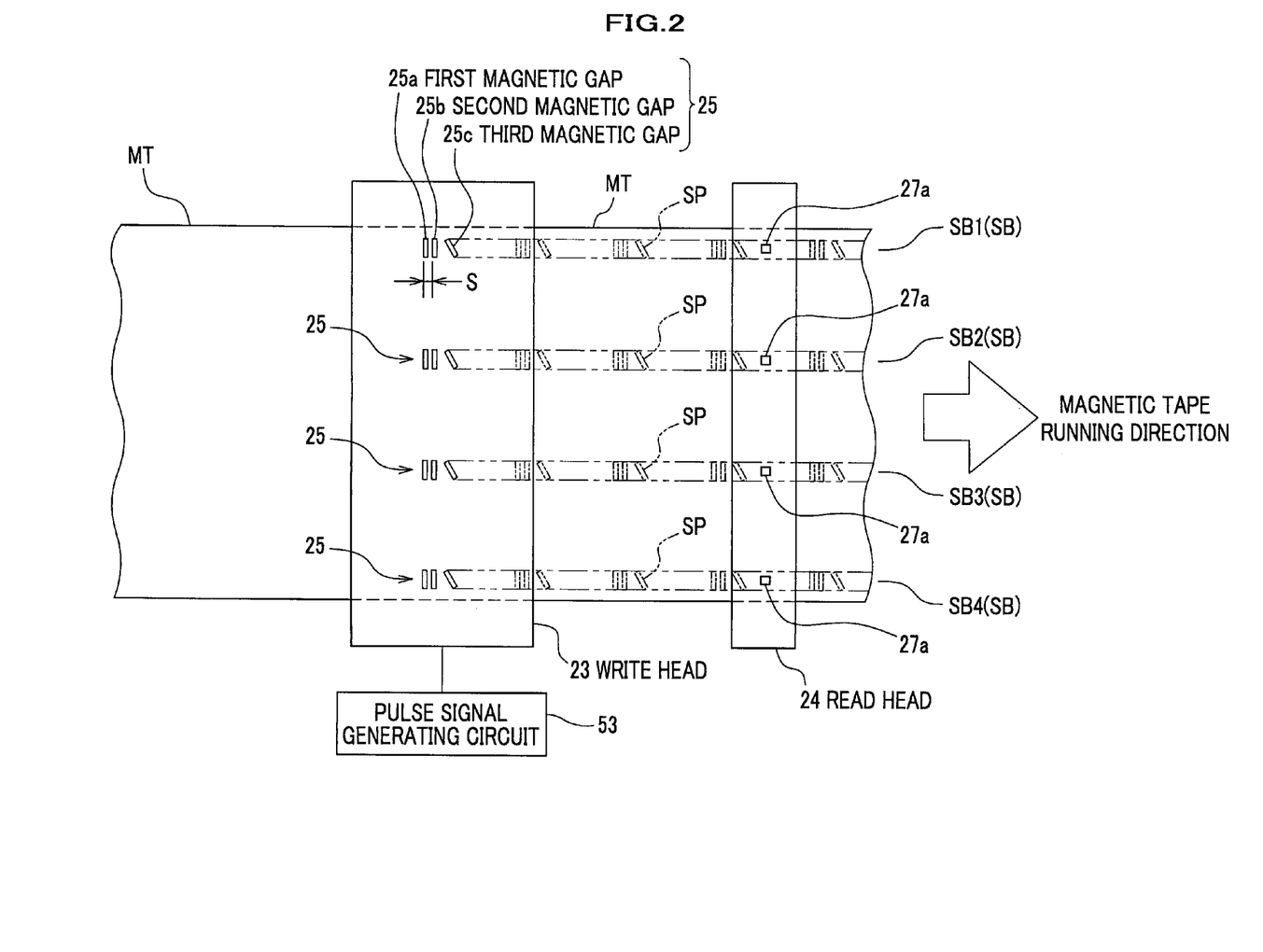
FIG. 2 is a schematic diagram showing a running magnetic tape, a write head for writing servo patterns and a read head for reading the servo patterns.
Figure 3A:
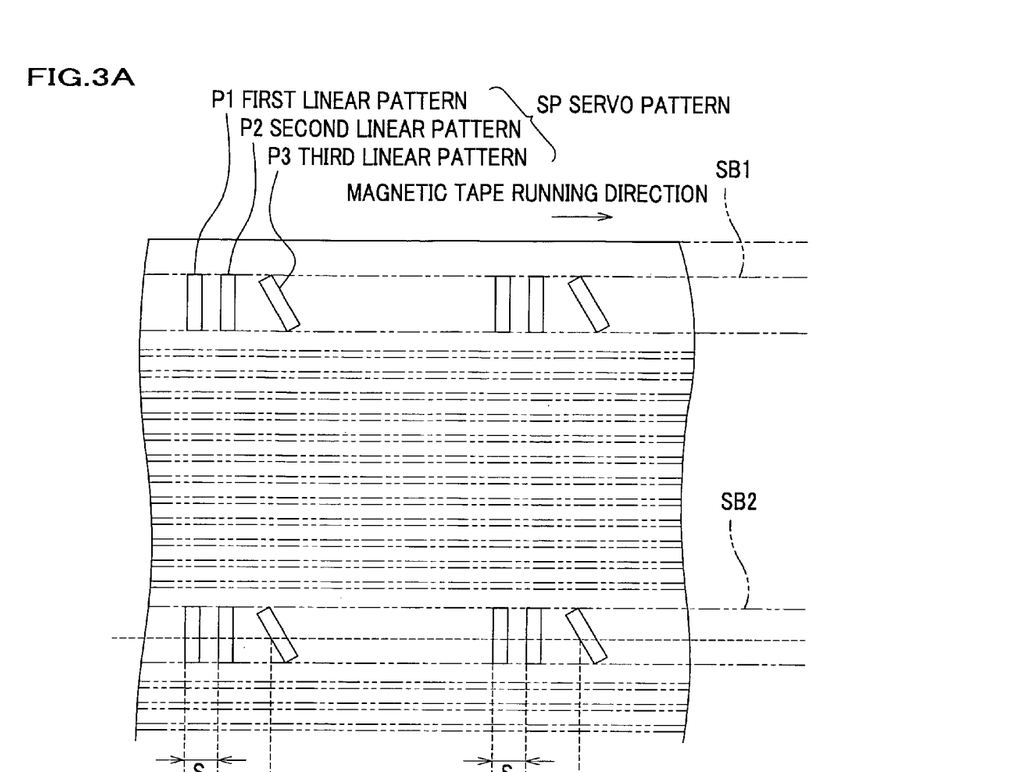
FIG. 3A shows an enlarged view of the servo pattern on the magnetic tape of FIG. 2.
Figure 3B:
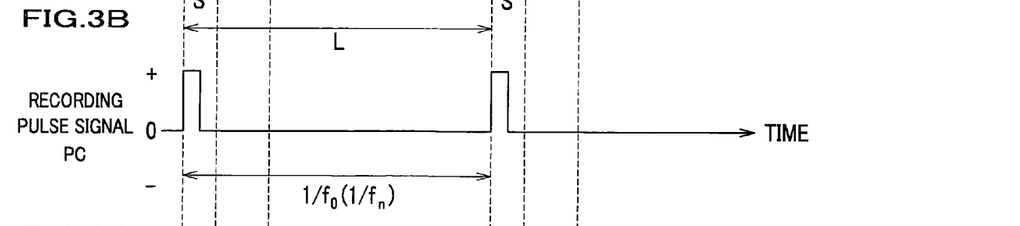
FIG. 3B shows recording pulse currents (pulse signals) input in the write head on the magnetic tape of FIG. 2.
Figure 3C:
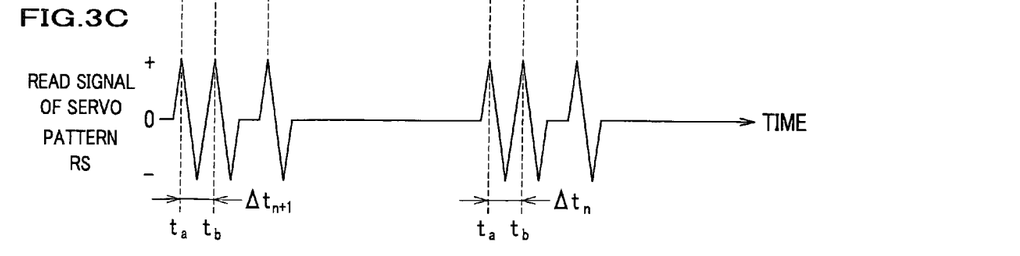
FIG. 3C shows read signals of the servo patterns output from the read head on the magnetic tape of FIG. 2.
Figure 4:
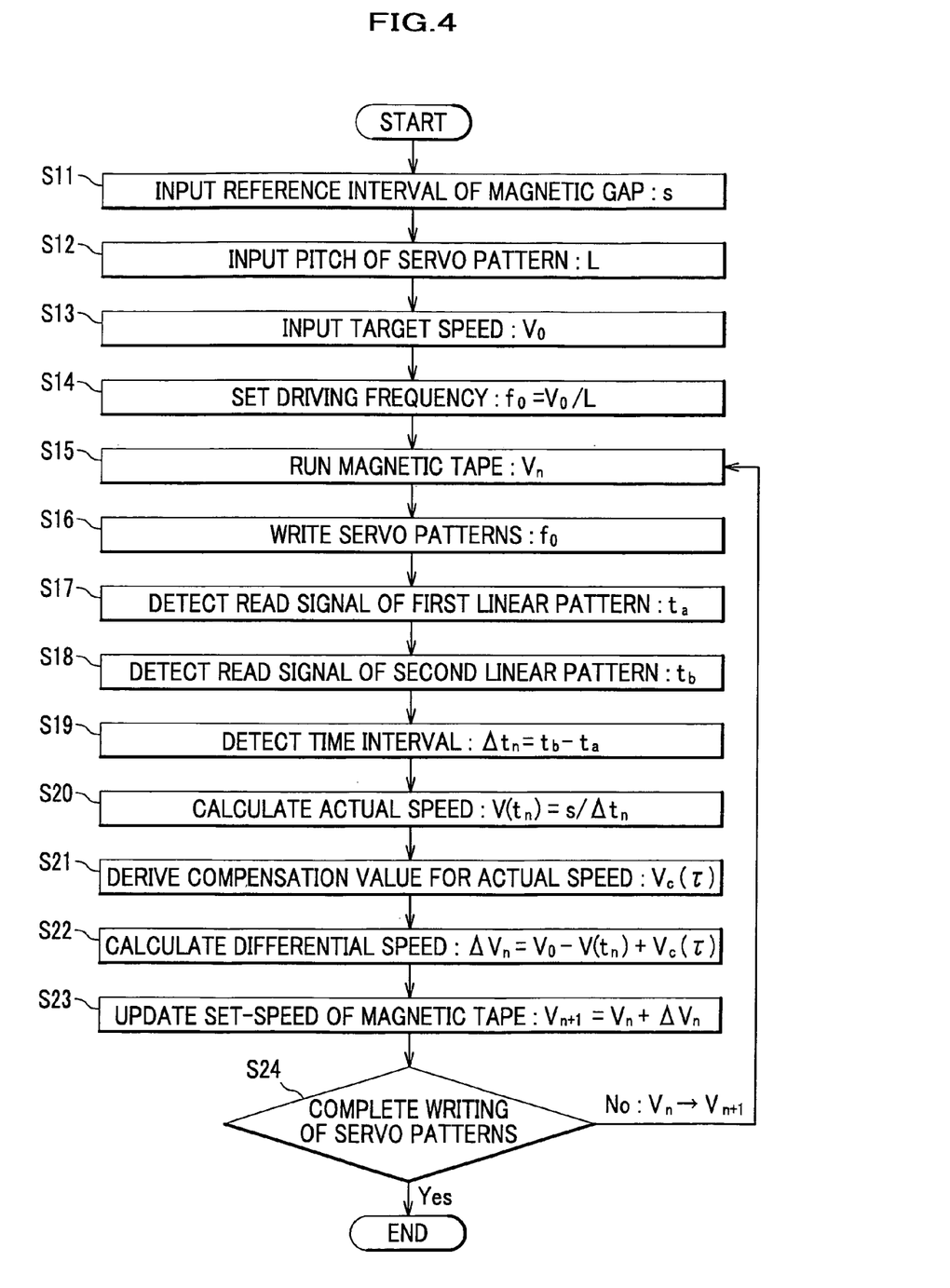
FIG. 4 is a flow chart for explaining an operation of the servo writer according to the first embodiment.

First, a first embodiment of the present invention will be described with reference to FIG. 1 through FIG. 4. FIG. 1 shows a line block diagram showing a basic constitution of a servo writer 20 according to the first embodiment. FIG. 2 shows a block diagram showing a write head 23 for writing servo patterns SP onto a magnetic tape MT and a read head 24 for reading the servo patterns SP thereon. FIG. 3A is an enlarged view of the servo patterns SP on the magnetic tape MT of FIG. 2. FIG. 3B shows recording pulse currents PC that are input into the write head 23, and FIG. 3C shows read signals RS of the servo patterns SP that are output from the read head 24. FIG. 4 is a flow chart describing the operation of the servo writer 20 according to the first embodiment.

As shown in FIG. 1, the servo writer 20 comprises a supply reel 21a, a take-up reel 21b, a capstan (tape running drive unit) 22, the write head 23, the read head 24, a guide 26, a control unit 30 and a pulse signal generating circuit 53, wherein the magnetic tape MT is provided thereacross.

The supply reel 21a is located at an uppermost side of the running magnetic tape MT, around which the magnetic tape MT having a product width into which a wide web roll material is cut is wound into a pancake-like shape with a large diameter. The magnetic tape MT wound around the supply reel 21a is in a state in which no servo patterns SP (see FIG. 2) are written on the magnetic surface thereof yet. In addition, the supply reel 21a rotates to feed out the magnetic tape MT, while a torque is applied in the reverse direction of the rotational direction so as to secure a stable running of the magnetic tape MT without looseness.

The take-up reel 21b is located at a lowermost side of the running magnetic tape MT and rotates to store the magnetic tape MT after completing the writing of the servo patterns SP (see FIG. 2) thereonto, while a torque is applied in the same direction of the rotational direction so as to secure a stable take-up of the magnetic tape MT without looseness.

The capstan (tape running drive unit) 22 has a column shape with a rotation radius r, rotating at an angle speed ω, with the magnetic tape MT in contact on the circumferential surface thereof. The capstan 22 serves for running the magnetic tape MT so that the running speed of the magnetic tape MT at the portion in contact with the write head 23 (described later) becomes the target speed $V_0$.

The write head 23 is provided on an up-stream side of the read head 24 (described later) on a running path of the magnetic tape MT. Further, the write head 23, as shown in FIG. 2, is a magnetic head for writing the servo patterns SP and is provided with a coil (not shown) for generating magnetic flux and a plurality of magnetic gaps 25 (four in the drawing) are also formed thereon.

These magnetic gaps 25 form four servo bands SB1, SB2, SB3 and SB4 respectively on the magnetic surface of the magnetic tape MT. Further, the magnetic gaps 25 comprise a first magnetic gap 25a and a second magnetic gap 25b that are formed in a linear shape in parallel to each other at a predetermined reference interval s and a third magnetic gap 25c that is inclinedly formed in a linear shape unparallel to these two magnetic gaps 25a and 25b. In this case, the first magnetic gap 25a and the second magnetic gap 25b are formed vertically to the longitudinal direction of the magnetic tape MT, and may have some inclination. As for the reference interval s between the first magnetic gap 25a and the second magnetic gap 25b, formation of this interval s is accomplished by lithography that is an application of semiconductor technologies, for the reason of necessity of a high accuracy for the reference interval s.

If the recording pulse currents PC (pulse signals output at the period of $1/f_0$) at a driving frequency $f_0$ as shown in FIG. 3B are input into the write head 23 constituted as described above, the servo patterns SP are formed in series on the magnetic surface of the magnetic tape MT into a servo band SB as shown in FIG. 3A. Now, the servo pattern SP comprises a first linear pattern P1, a second linear pattern P2 and a third linear pattern P3, which are formed by the first magnetic gap 25a, the second magnetic gap 25b and the third magnetic gap 25c respectively, and all of which have an identical shape and allocation in each of the servo patterns.

Note that the first linear pattern P1 and the second linear pattern P2 are formed by the first magnetic gap 25a and the second magnetic gap 25b that are formed at a highly accurate reference interval s therebetween; therefore, the linear pattern P1 and the linear pattern P2 are naturally formed at the highly accurate reference interval s therebetween as well. An improvement in accuracy on a pitch L between a plurality of consecutive servo patterns SP, SP . . . is also included in the object of the present invention. Omitting a detailed explanation, a room between the plural servo bands SB, SB . . . will be a region where data bands (represented by two dotted and dashed lines in FIG. 3A) for saving data information are written.

The pulse signal generating circuit 53 serves for inputting a clock signal at the driving frequency $f_0$, generating the recording pulse currents (pulse signal) PC (see FIG. 3B) having the identical frequency $f_0$ (period of $1/f_0$), and then outputting them to a coil of the write head 23 (not shown). An appropriate adjustment is provided for the pulse width and the pulse height of the recording pulse currents PC so as to obtain an optimum figure of the servo patterns SP to be written onto the magnetic surface of the magnetic tape MT by the write head 23.

The description will be continued, referring again to FIG. 1.

The read head 24 is provided on the running path of the magnetic tape MT on the down-stream side of the write head 23 at a distance d from the write head 23. In view of a stable control on a control unit 30 in order to write the servo patterns SP with the accurate pitches, it is desirable to minimize this distance d as much as possible. Hence the read head 24 is preferably provided adjacent to the write head 23.

As shown in FIG. 2, the read head 24 has a plurality of read elements 27a, 27a . . . , which are disposed in correspondence to the servo bands SB (SB1, SB2 . . . ). And each read element 27a traces its corresponding servo band SB so as to read the first linear pattern P1, the second linear pattern P2 and the third linear pattern P3 in the servo pattern SP separately.

The read head 24 (more precisely, read element 27a) traces the servo band SB, reads (senses) the first linear pattern P1, the second linear pattern P2 and the third linear pattern P3, and then outputs pulse signals corresponding to the read signals RS, as shown in FIG. 3C. Then, the read head 24 moves in the width direction of the magnetic tape MT so that the read signals RS corresponding to the first linear pattern P1 and the third linear pattern P3 always keep a constant time interval therebetween. Thereby, the read elements 27a, 27a . . . can securely trace the corresponding servo bands SB (SB1, SB2 . . . ) without deviating therefrom.

The description will be continued, referencing again to FIG. 1.

The control unit 30 comprises an initial condition input unit 31, a target speed input unit 32, a set-speed updating unit 33, a rotational drive control circuit 35, a time interval detector 41, an actual speed calculator 42, a differential speed calculator 43, a driving frequency setting unit 51, a frequency demultiplier 52 and a basic clock oscillator 60.

With the magnetic tape MT kept running at a constant speed of the predetermined target speed $V_0$, the control unit 30 drives the write head 23 at a constant driving frequency $f_0$ to write the servo patterns SP, so that the servo patterns SP can be provided at a predetermined pitch L therebetween onto the magnetic surface of the magnetic tape MT.

The initial condition input unit 31 serves for inputting initial conditions in advance, under which the servo writer 20 is controlled. The conditions to be input on this step are the pitch L, and a reference interval s between the first magnetic gap 25a and the second magnetic gap 25b. As described later, referencing to the length of the reference interval s which has been input herein, the servo patterns SP are supposed to be written onto the magnetic surface in such a manner that each pitch between the servo patterns SP agrees with the pitch L.

The target speed input unit 32 serves for inputting the target speed $V_0$ so as to run the magnetic tape MT at a constant running speed. Now, there may be a case that the target speed $V_0$ is input after calculated based on the following equation if the driving frequency $f_0$ of the write head 23 is previously set on the driving frequency setting unit 51 (described later)

$$V_0 = L \times f_0 \qquad (1)$$

The set-speed updating unit 33 serves for updating the set-speed $V_n$ of the capstan 22 so that the actual running speed (hereinafter referred to as actual speed $V(t_n)$) of the magnetic MT becomes closer to the target speed $V_0$. Specifically, the set-speed updating unit 33 updates the current set-speed $V_n$ to a next set-speed $V_{n+1}$ by adding to the current set-speed $V_n$ a differential speed $\Delta V_n$ between the actual speed $V(t_n)$ of the magnetic tape MT measured by the read head 24 and the target speed $V_0$. This updated set-speed $V_{n+1}$ is represented by the following equation in relation to the previous set-speed $V_n$ before updated:

$$V_n+1=V_n+\Delta V_n \quad (2)$$

The rotational drive control circuit 35 inputs the set-speeds $V_n$, $V_{n+1}$ . . . , which are updated over time, rotates the capstan 22 to run the magnetic tape MT in external contact with the capstan 22. This continuous updating of the set-speed $V_{n+1}$ converges the actual speed $V(t_n)$ of the magnetic tape MT to the target speed $V_0$.

In addition, the rotational drive control circuit 35 converts a signal of the input set-speed $V_{n+1}$ into a rotational speed signal (angle speed ω), and then outputs the converted rotational speed signal to the capstan 22. Assuming that the rotational radius of the capstan 22 is r, the set-speed $V_{n+1}$ and the angle speed $\omega_{n+1}$ satisfy the following equation:

$$V_n+1=\omega_n+1\times r \quad (3)$$

The time interval detector 41 inputs the read signals RS (see FIG. 3A) which the read head 24 has read out by tracing the servo band SB (see FIG. 3A), and then detects and outputs the time interval $\Delta t_n$ between the response wave (pulse signals) in correspondence to the first linear pattern P1 and the response wave (pulse signals) in correspondence to the second linear pattern P2 (see FIG. 3A). The measurement on the time interval $\Delta t_n$ is made by measuring the time interval between the detected time at the response wave (pulse signal) corresponding to the first linear pattern P1 and the detected time at the response wave (pulse signal) corresponding to the second linear pattern P2, by use of the basic clock of the basic clock oscillator 60, as shown in FIG. 3C.

The actual speed calculator 42 serves for inputting the time interval $\Delta t_n$, and calculating the actual running speed (actual speed $V(t_n)$) of the running magnetic tape MT, based on the following equation. Now, the time interval $\Delta t_n$ is corresponding to the time interval between the first linear pattern P1 and the second linear pattern P2 each of which is detected on the read head 24. Moreover, in this embodiment, from the following equation, it can be said that aiming at converging the actual speed $V(t_n)$ of the magnetic tape MT to the target speed $V_0$ is equivalent to controlling the capstan (tape running drive unit) 22 based on the time interval $\Delta t_n$ detected on the read head 24.

$$V(t_n)=s/\Delta t_n \quad (4)$$

The differential speed calculator 43 serves for finding the differential speed $\Delta V_n$ based on the following equation. Note that this differential speed $\Delta V_n$ refers to a difference between the actual running speed of the running magnetic tape MT (actual speed $V(t_n)$) and the running speed targeted (target speed $V_0$).

$$\Delta V_n=V_0-V(t_n) \quad (5)$$

The differential speed $\Delta V_n$ can be represented by, not limited to, the above equation (5), but there may also be a case of further addition of compensating factors if considering various conditions. For example, considering the distance d between the write head 23 and the read head 24, the actual speed $V(t_n)$ is a value detected on the read head 24, that is, a value obtained from the measurement on the actual running speed on the read head 24 including a time lag τ represented in the following equation. Hence, there may be a case as shown in the equation (5') by compensating the above equation (5). Where, $V_c(\tau)$ is a compensated value derived by extrapolation from the variation of the previous actual speeds ( . . . $V(t_{n-2})$, $V(t_{n-1})$ . . . ).

$$\tau=d/V(t_n) \quad (6)$$

$$\Delta V_n=V_0-V(t_n)+V_c(\tau) \quad (5')$$

The driving frequency setting unit 51 serves for providing calculation and setting of the driving frequency $f_0$ of the write head 23, based on the above equation (1) using the target speed $V_0$ that has been set in advance. Or the driving frequency $f_0$ may be set as an input value before inputting the target speed $V_0$.

The frequency demultiplier 52 serves for demultiplying a clock signal at the driving frequency $f_0$ that has been set on the driving frequency setting unit 51 by using a basic clock signal that the basic clock oscillator 60 oscillates, and then outputting this signal.

With reference to FIG. 1 and FIG. 4, an explanation will be given on an operation of the servo writer 20 according to the first embodiment.

First, the pitch L and the reference interval s are input as initial conditions into the initial condition input unit 31 (S11, S12). Next, as control conditions, the target speed $V_0$ is set on the target speed input unit 32 (S13) and the driving frequency $f_0$ is set on the driving frequency setting unit 51 (S14). Note that, if either of the driving frequency $f_0$ or the target speed $V_0$ is determined, the other will also be determined depending on the above the equation (1). Therefore, either of Step S13 and Step S14 may be followed by the other and vice versa.

Following the above steps, the capstan 22 is operated at the set-speed $V_n$ to run the magnetic tape MT (S15). With this magnetic tape MT kept running in this state, the write head 23 is allowed to operate at the driving frequency $f_0$ that has been set on Step S14, so as to write the servo patterns SP onto the magnetic surface of the magnetic tape MT (S16). Then, the read head 24 on the down-stream side detects and outputs the first linear pattern P1 and the second linear pattern P2 in the servo pattern SP as read signals RS (S17, S18).

Then, the time interval $\Delta t_n$ between the read signals RS is detected by the time interval detector 41 (S19), and based on this detected time interval $\Delta t_n$, the actual speed $V(t_n)$ of the magnetic tape MT is calculated by the actual speed calculator 42 (S20). If necessary, the compensated value $V_c(\tau)$ for the actual speed $V(t_n)$ may be obtained by compensating the error due to the time lag τ resulted from the distance d between the write head 23 and the read head 24, (S21).

Thereafter, the difference between the target speed $V_0$ and this actual speed $V(t_n)$ (differential speed $\Delta V_n$) is calculated (S22). This differential speed $\Delta V_n$ is added to the set-speed $V_n$, and then is updated to the set-speed $V_{n+1}$ (S23). In accordance with this new updated set-speed $V_{n+1}$, the capstan 22 is allowed to operate to run the magnetic tape MT. Then, a determination is made on whether the writing is completed or not, and if not completed yet, the step will return to S15 (S24: No). By repeating this loop, the actual speed $V(t_n)$ of the magnetic tape MT converges to the target speed $V_0$ until it becomes a constant value. When completing the writing of the servo patterns SP onto the magnetic tape MT, a series of the operation is completed (S24:Yes). Note that converging the actual speed $V(t_n)$ of the magnetic tape MT to the target speed $V_0$ is equivalent to operating the capstan 22 in accordance with the time interval $\Delta t_n$.

As described above, in the servo writer 20 according to the first embodiment of the present invention, the magnetic tape MT performs running at a constant speed in such a manner that the actual running speed (actual speed $V(t_n)$) strictly agrees with the target speed $V_0$. And the write head 23 writes the servo patterns SP at the constant driving frequency $f_0$ onto the magnetic tape MT which is running at the constant speed. Accordingly, each pitch L between a plurality of the consecutive servo patterns SP, SP . . . agrees with the input value that has been input into the initial condition input unit 31, with a high accuracy without variations.

Second Embodiment

Figure 5:
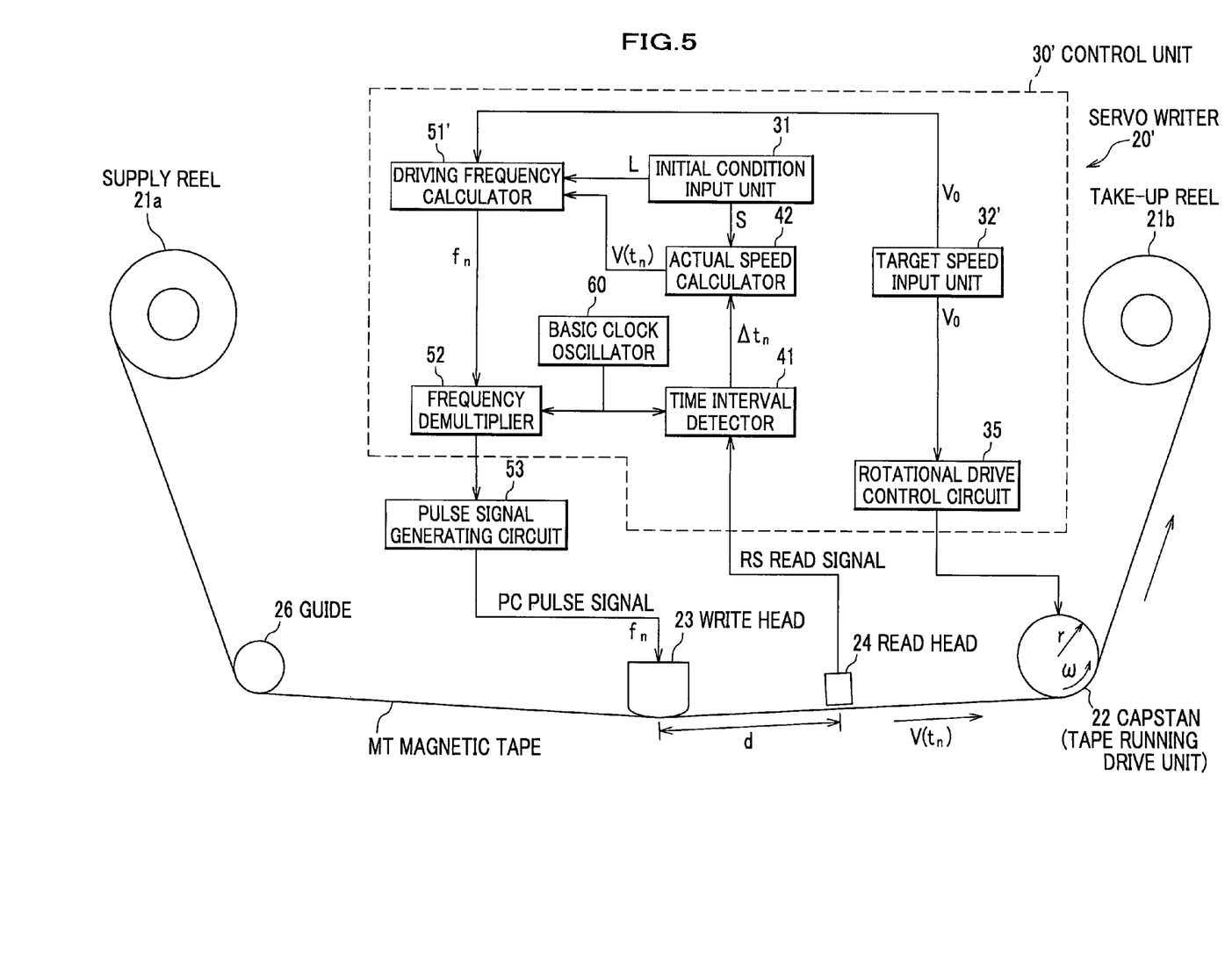
FIG. 5 is a line block diagram showing a basic constitution of a servo writer according to a second embodiment.
Figure 6:
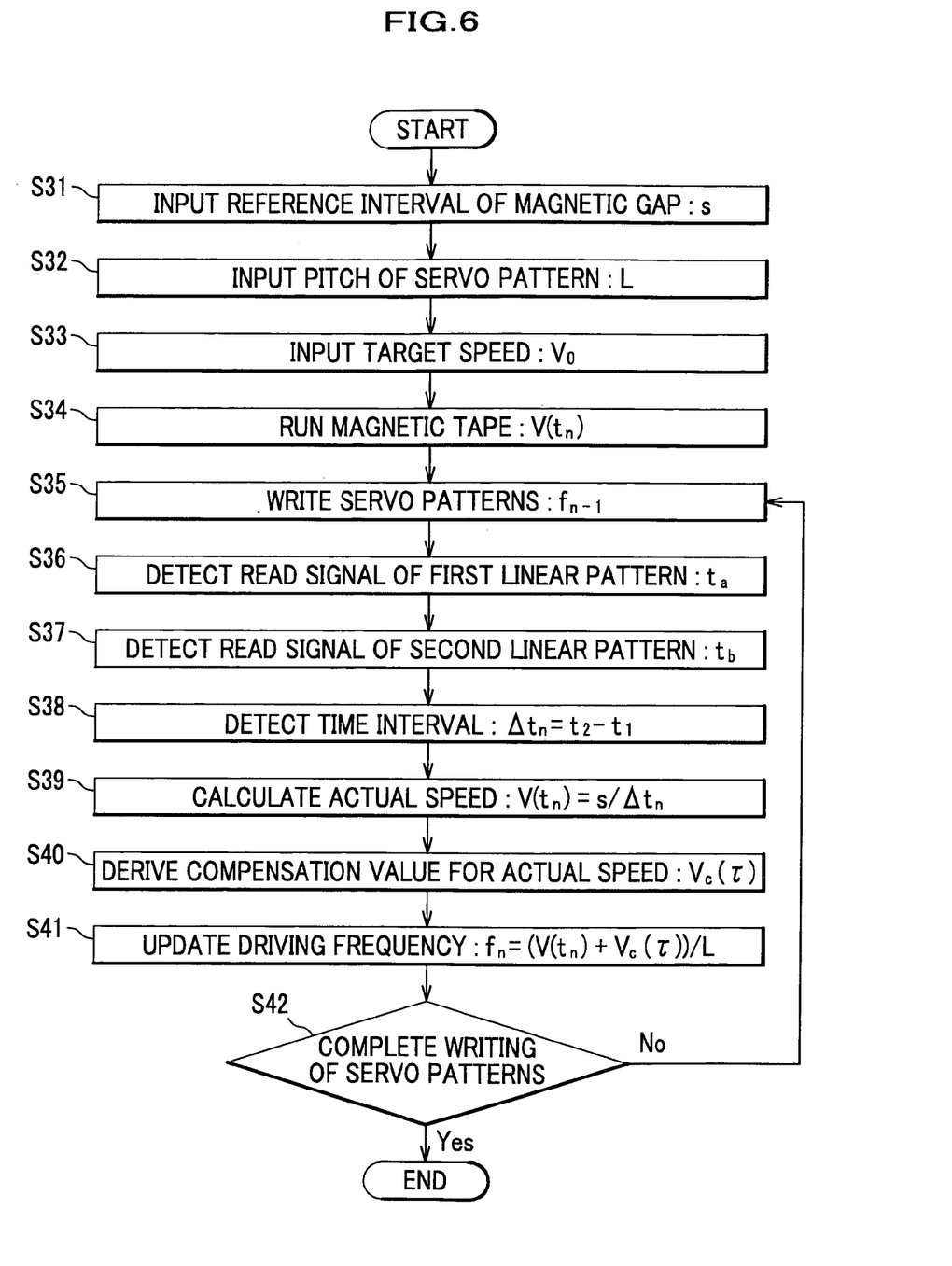
FIG. 6 is a flow chart for explaining an operation of the servo writer according to the second embodiment.

A second embodiment of the present invention will be described hereinafter with reference to FIG. 5 and FIG. 6. FIG. 5 shows a line block diagram explaining a basic constitution of a servo writer 20' of the second embodiment. FIG. 6 is a flow chart explaining the operation of the servo writer 20' according to the second embodiment. Note that like components of FIG. 5 are denoted by like reference numerals as of FIG. 1 and equivalent components of FIG. 5 are represented by adding "'" to the like reference numerals of FIG. 1. An explanation on each component should be referred to the above explanations, for the sake of explaining no more details.

A control unit 30' according to the second embodiment differs from the control unit 30 according to the first embodiment, in terms of the followings. That is, the first embodiment provides a control on the actual speed $V(t_n)$ of the magnetic tape MT for a strict agreement with the target speed $V_0$. To the contrary, the second embodiment provides none of such a control on the actual speed $V(t_n)$ for a strict agreement with the target speed $V_0$. Instead of setting the driving frequency $f_0$ to a constant value on the write head 23 in the first embodiment, the second embodiment varies the driving frequency $f_n$ in accordance with the measured actual speeds $V(t_n)$ of the magnetic tape MT (see equation (4)), so as to ensure precision of the pitch L between the servo patterns SP, SP . . . .

Therefore, the target speed $V_0$ which has been input into a target speed input unit 32' is maintained to be output to the rotational drive control circuit 35 without providing any updating of the value. A driving frequency calculator 51' calculates the driving frequency $f_n$ for driving the write head 23 by using the actual speed $V(t_n)$ obtained on the actual speed calculator 42 based on the following equation. From this equation, it can be said that the driving frequency $f_n$ varies in accordance with the actual speed $V(t_n)$ of the magnetic tape MT or the time interval $\Delta t_n$.

$$f_n = V(t_n)/L \tag{7}$$

Note that this driving frequency $f_n$ is not limited to the case of the above the equation (7), and further compensation factors may be added if considering various conditions. For example, as described above, considering the distance d between the write head 23 and the read head 24, the equation (7) may be represented as the equation (7') by compensating the time lag $\tau$ (see equation (6)) between the actual speed $V(t_n)$ and the actual running speed at the read head 24. Where, $V_c(\tau)$ is a compensation value obtained by extrapolation from the variation of the previous actual speed ( . . . $V(t_{n-2})$, $V(t_{n-1})$).

$$f_n = (V(t_n) + (V_c(\tau))/L \tag{7'}$$

An operation of the servo writer 20' according to the second embodiment will be descried with reference to FIG. 5 and FIG. 6.

First, into the initial condition input unit 31, the pitch L and the reference interval s are input as initial conditions (S31, S32). Next, on the target speed input unit 32', the target speed $V_0$ is set as a control condition (S33).

Then, by using the target speed $V_0$ for the set-speed $V_n$, the capstan 22 is operated to run the magnetic tape MT. At this time, since no special control is provided for the magnetic tape MT to be kept running at a constant speed, the magnetic tape MT runs at the actual speed $V(t_n)$ having variations in the running speed thereof (S34). The write head 23 is operated at the driving frequency $f_{n-1}$ with the magnetic tape MT kept running at various speeds, writing servo patterns SP onto the magnetic tape MT (S35). On the read head 24 disposed on the down-stream side, the read signals RS in correspondence with the first linear pattern P1 and the second linear pattern P2 are detected (S36, S37).

Further, the time interval $\Delta t_n$ is detected by the time interval detector 41 (S38), and then the actual running speed of the magnetic tape MT is calculated by the actual speed calculator 42 based on this time interval $\Delta t_n$ (S39). If necessary, compensation value $V_c(\tau)$ for the actual speed is obtained by compensating the error due to the time lag $\tau$ resulted from the distance d between the write head 23 and the read head 24 (S40)

Thereafter, the driving frequency calculator 51' calculates and updates the driving frequency $f_n$ (S41), and at the driving frequency $f_n$, the write head 23 is operated to write the servo patterns SP onto the magnetic surface of the magnetic tape MT. A determination is made on whether the writing is completed or not, and if not completed yet, the step will return to S35 (S42: No). Eventually, after completing the writing of the servo patterns SP onto the magnetic tape MT, a series of the operation of the servo writer 20' is completed. (S42: Yes)

As described above, according to the servo writer 20' of the second embodiment, although the magnetic tape MT does not maintain a constant speed running, the write head 23 writes the servo patterns SP onto the magnetic tape MT by varying the driving frequency $f_n$ in correspondence with the actual speed $V(t_n)$. Thereby, each of the pitches L between a plurality of consecutive servo patterns SP, SP . . . written on the magnetic tape MT agrees with the input value which has been input into the initial condition input unit 31 with a high accuracy without variations.

The preferred embodiments as described above show examples to explain the present invention, and the present invention is not limited to the above preferred embodiments. Therefore, other various modifications and alternations can be applied thereto without departing from the spirit and scope of the invention.

For example, the first linear pattern P1 and the second linear pattern P2 are both provided in the vertical direction relative to the longitudinal direction of the magnetic tape MT, but they may have some inclination.

Moreover, the servo writer of the present invention is not limited to an embodiment as a separate device, and another embodiment is also feasible, for example, by applying additional mechanism to a conventional servo writer or by assembling individual devices that work separately.

What is claimed is:

1. A servo writer comprising:
   a tape running drive unit for running a magnetic tape in a longitudinal direction;
   a pulse signal generating circuit for generating pulse signals;
   a write head disposed on a running path of said magnetic tape, having a plurality of linear magnetic gaps thereon in a running direction of said magnetic tape at a predetermined interval, inputting pulse signals generated by said pulse signal generating circuit, and writing each of servo patterns one by one at the same timing corresponding to said magnetic gaps onto said magnetic tape with pitches between said servo patterns, wherein at least two of said plurality of linear magnetic gaps are parallel to each other;

a read head disposed on a down-stream side of said write head on the running path of said magnetic tape, sensing each of said servo patterns written one by one at the same timing on said magnetic tape by the write head and outputting pulse signals corresponding to said sensed servo patterns; and a control unit for controlling said tape running drive unit based on a time interval between pulse signals, among the pulse signals output from said read head, resulted from two of appropriate linear patterns in parallel included in each of said servo pattern written at the same timing by the write head, so as to maintain constant the running speed of said magnetic tape.

2. The servo writer according to claim 1, wherein said control unit further comprises:

an actual speed calculator for calculating an actual running speed of said magnetic tape based on the time interval between the pulse signals resulted from two of the appropriate linear patterns in parallel included in each of said servo pattern written at the same timing by the write head and on an interval between two of the magnetic gaps in parallel on said write head corresponding to said two of the appropriate linear patterns in parallel;

a differential speed calculator for calculating a differential speed based on a predetermined target speed and on said calculated actual running speed of said magnetic tape; and a set-speed updating unit for updating a set-speed of said tape running drive unit based on said differential speed.

3. The servo writer according to claim 1, wherein said two of the appropriate linear patterns in parallel included in each of said servo patterns are disposed vertically to the longitudinal direction of said magnetic tape.

4. The servo writer according to claim 1, wherein said two of the appropriate linear patterns in parallel included in each of said servo patterns are disposed inclinedly to the longitudinal direction of said magnetic tape.

5. The servo writer according to claim 1, wherein each servo pattern comprises a first linear pattern, a second linear pattern and a third linear pattern, and said first, second and third linear patterns have an identical shape and allocation in each of said servo patterns.

6. The servo writer according to claim 1, wherein the two of the appropriate linear patterns are adjacent to one another.

7. The servo writer according to claim 6, wherein each linear pattern is created by a single pulse signal.

8. The servo writer according to claim 1, wherein the write head further inputs the pulse signals generated at a predetermined frequency by said pulse signal generating circuit, and the control unit further controls setting of said predetermined frequency so that said pulse signal generating circuit generates pulse signals at the predetermined frequency.

9. The servo writer according to claim 1, wherein said control unit further comprises:

a driving frequency setting unit for setting the predetermined frequency;

an actual speed calculator for calculating an actual running speed of said magnetic tape based on the time interval between the pulse signals resulting from two of the appropriate linear patterns in parallel included in each of said servo patterns and on an interval between two of the magnetic gaps in parallel on said write head corresponding to said two of the appropriate linear patterns in parallel;

a differential speed calculator for calculating a differential speed based on a predetermined target speed and on said calculated actual running speed of said magnetic tape; and a set-speed updating unit for updating a set-speed of said tape running drive unit based on said differential speed.

10. A servo writer comprising:

a tape running drive unit for running a magnetic tape in a longitudinal direction;

a pulse signal generating circuit for generating pulse signals;

a write head disposed on a running path of said magnetic tape, having a plurality of linear magnetic gaps thereon in a running path of said magnetic tape at a predetermined interval, inputting pulse signals generated by said pulse signal generating circuit, and writing servo patterns corresponding to said magnetic gaps onto said magnetic tape with pitches between said servo patterns, wherein at least two of said plurality of linear magnetic gaps are parallel to each other;

a read head disposed on a down-stream side of said write head on the running path of said magnetic tape, sensing the servo patterns written on said magnetic tape and outputting pulse signals corresponding to said sensed servo patterns; and a controller for controlling said pulse signal generating circuit based on a time interval between pulse signals, among the pulse signals output from said read head, resulted from two of appropriate linear patterns in parallel included in each of said servo patterns, so as to maintain constant the pitches between said servo patterns adjacent in the longitudinal direction of said magnetic tape.

11. The servo writer according to claim 10, wherein said control unit further comprises:

an actual speed calculator for calculating an actual running speed of said magnetic tape based on the time interval between the pulse signals resulted from two of the appropriate linear patterns in parallel included in each of said servo patterns and on the interval between two of the magnetic gaps in parallel on said write head corresponding to said two of the appropriate linear patterns in parallel; and a driving frequency calculator for calculating driving frequencies of said pulse signals based on a predetermined target pitch for the pitches between said servo patterns and on said calculated actual running speed of said magnetic tape.

12. The servo writer according to claim 10, wherein said two of the appropriate linear patterns in parallel included in each of said servo patterns are disposed vertically to the longitudinal direction of said magnetic tape.

13. The servo writer according to claim 10, wherein said two of the appropriate linear patterns in parallel included in each of said servo patterns are disposed inclinedly to the longitudinal direction of said magnetic tape.

14. A method for writing servo patterns comprising the steps of:

disposing a write head having a plurality of linear magnetic gaps thereon at a predetermined interval in a running direction of a magnetic tape on a running path of said magnetic tape, and a read head on a down-stream side of said write head on the running path of said magnetic tape;

generating pulse signals and inputting said pulse signals into said write head;

allowing said write head to write servo patterns corresponding to said magnetic gaps onto said magnetic tape with pitches between said servo patterns based on said input pulse signals;

allowing said read head to sense said servo patterns and output pulse signals corresponding to said sensed servo patterns; and providing a control to maintain constant the pitches between said servo patters adjacent in the longitudinal direction of said magnetic tape based on a time interval between pulse signals, among the pulse signals output from said read head, resulted from two of appropriate linear patterns in parallel included in each of said servo patterns.

15. The method for writing servo patterns according to claim 14, wherein said control changes a set-speed so as to maintain constant the actual running speed of said magnetic tape.

16. The method for writing servo patterns according to claim 14, wherein said control:

calculates the actual running speed of said magnetic tape based on the time interval between the pulse signals resulted from two of the appropriate linear patterns in parallel included in each of said servo patterns and on the interval between said two of the magnetic gaps in parallel on said write head corresponding to said two of the appropriate linear patterns in parallel; and calculates a differential speed based on a predetermined target speed and on said calculated actual running speed of said magnetic tape.

17. The method for writing servo patterns according to claim 16, wherein said control changes a set-speed so as to maintain constant the actual running speed of said magnetic tape.

18. The method for writing servo patterns according to claim 14, wherein said control varies driving frequencies of pulse signals to be input into said write head in accordance with variations in running speed of said magnetic tape.

19. The method for writing servo patterns according to claim 14, wherein said control:

calculates the actual running speed of said magnetic tape based on the time interval between the pulse signals resulted from two of the appropriate linear patterns in parallel included in each of said servo patterns and on the interval between said two of the magnetic gaps in parallel on said write head corresponding to said two of the appropriate linear patterns in parallel; and calculates driving frequencies of said pulse signals based on a predetermined target pitch for the pitches between said servo patterns and on said calculated actual running speed of said magnetic tape.

20. The method for writing servo patterns according to claim 19, wherein said control varies driving frequencies of pulse signals to be input into said write head in accordance with variations in a running speed of said magnetic tape.

* * * * *